(12) United States Patent
Okumura (10) Patent No.: US 8,330,986 B2
(45) Date of Patent: Dec. 11, 2012

(54) IMAGE FORMING APPARATUS

(75) Inventor: Ryuichi Okumura, Osaka (JP)

(73) Assignee: Kyocera Mita Corporation (JP)

( * ) Notice: Subject to any disclaimer, the term of this patent is extended or adjusted under 35 U.S.C. 154(b) by 603 days.

(21) Appl. No.: 12/638,086

(22) Filed: Dec. 15, 2009

(65) Prior Publication Data
US 2010/0165405 A1    Jul. 1, 2010

(30) Foreign Application Priority Data
Dec. 25, 2008 (JP) .................. 2008-330701

(51) Int. Cl.
*G06K 15/00* (2006.01)
(52) U.S. Cl. .................. 358/1.16; 358/1.18
(58) Field of Classification Search .......... None
See application file for complete search history.

(56) References Cited

U.S. PATENT DOCUMENTS
2007/0172283 A1* 7/2007 Kurohata .............. 400/76
2009/0080033 A1* 3/2009 Arai ................ 358/462

FOREIGN PATENT DOCUMENTS
JP    2007-82010    3/2007

\* cited by examiner

*Primary Examiner* — Marivelisse Santiago Cordero
*Assistant Examiner* — Mesfin Getaneh
(74) *Attorney, Agent, or Firm* — Gerald E. Hespos; Michael J. Porco (57) ABSTRACT

An image forming apparatus has a printing unit for executing a single-sided print job and a double-sided print job. A storage unit stores print target data as backing sheet image data when a single-sided print job is executed. An image reading unit reads images on both sides of a document that is subjected to image processing. A backing sheet judgment unit judges whether there is an image that matches a backing sheet image among the images on both sides of the document by comparing the document image data read by the image reading unit with the backing sheet image data stored in the storage unit. An exclusion processing unit performs processing to exclude from the image processing targets an image judged by the backing sheet judgment unit to match the backing sheet image among the images on both sides of the document read by the image reading unit.

7 Claims, 6 Drawing Sheets

IMAGE FORMING APPARATUS

BACKGROUND OF THE INVENTION

1. Field of the Invention

The present invention relates to an image forming apparatus such as a digital multifunction machine provided with a copy function, a facsimile function, and a printer function, and the like.

2. Description of the Related Art

Image forming apparatuses such as digital multifunction machines conventionally include apparatuses which automatically read document images by means of an image reading apparatus that includes an Automatic Document Feeder (ADF). If the apparatus is an automatic document feeder compatible with double-sided printing, images on both the upper and reverse sides of the document can be read automatically.

Even though images may be recorded on both sides of a document, there exist single-sided documents that use a so-called backing sheet. In this case, even though reading is performed using an automatic document feeder which is compatible with double-sided reading, an image is required only on the upper side and not required on the reverse side.

For example, if a single-sided document that uses a backing sheet comes to be mixed in with double-sided documents (documents with required images recorded on their upper and reverse sides) and the documents are read using an automatic document feeder compatible with double-sided reading, copy processing or filing processing are performed with the inclusion of unnecessary backing sheet data.

Accordingly, a technology has been proposed whereby the user is able to preset backing sheet pattern data which is information specifying a backing sheet, with which backing sheet data that matches backing sheet pattern data is detected from among document image data that is read using an automatic document feeder compatible with double-sided reading, and with which copy processing or filing processing is performed by removing backing sheet data from the read document image data.

However, with the above technology, the user is forced to perform a complicated setting operation since the user must preset backing sheet pattern data, which is information for specifying a backing sheet.

SUMMARY OF THE INVENTION

An object of the present invention is to provide an image forming apparatus with which the user's workload can be alleviated.

An image forming apparatus according to an aspect of the present invention that achieves this object, having: a printing unit capable of executing a single-sided print job in which one side of a sheet is printed and a double-sided print job in which both sides of the sheet are printed; a storage unit for storing print target data as backing sheet image data in a case where a single-sided print job is executed by the printing unit with respect to the print target data; an image reading unit for reading images on both sides of a document that is subjected to image processing; a backing sheet judgment unit for judging whether there is an image that matches a backing sheet image among the images on both sides of the document by comparing the document image data read by the image reading unit with the backing sheet image data stored in the storage unit; and an exclusion processing unit for performing processing to exclude from the image processing targets an image which is judged by the backing sheet judgment unit to match the backing sheet image among the images on both sides of the document read by the image reading unit.

DETAILED DESCRIPTION OF THE PREFERRED EMBODIMENTS

An embodiment of the image forming apparatus according to the present invention will be described hereinbelow with reference to the drawings. Note that, in the following embodiment, the image forming apparatus according to the present invention will be described by taking, byway of example, an embodiment based on a multifunction machine that comprises a color copy function, a scanner function, a facsimile function, and a printer function.

Figure 1:
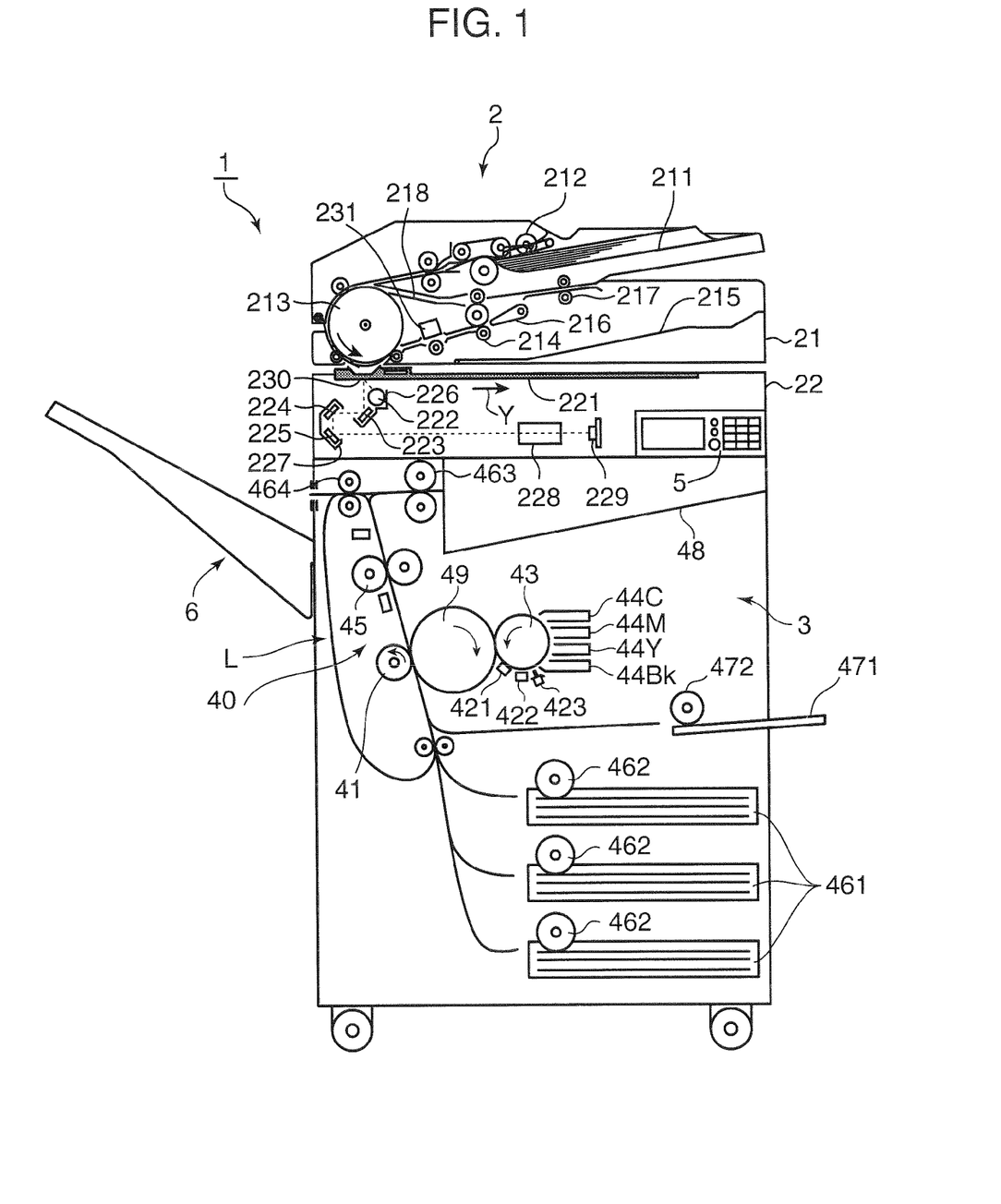
FIG. 1 is a vertical sectional view that schematically shows the internal configuration of a multifunction machine, which is an embodiment of an image forming apparatus according to the present invention.

FIG. 1 is a vertical sectional view that schematically shows the internal configuration of a multifunction machine 1, which is an embodiment of the image forming apparatus according to the present invention. The multifunction machine 1 comprises, in broad terms, an image reading device (image reading means) 2, and a device main body 3. The image reading device 2 comprises a document supply unit 21, a scanner unit 22, a Contact Image Sensor (CIS) 231, and a reversing mechanism (described subsequently). The document supply unit 21 comprises an Automatic Document Feeder (ADF), and includes a document tray 211, a pickup roller 212, a conveyance drum 213, a paper discharge roller 214, and a paper discharge tray 215. The document tray 211 has documents which are to be read placed therein. The documents placed in the document tray 211 are picked up one sheet at a time by the pickup roller 212 and conveyed to the conveyance drum 213. After passing the conveyance drum 213, the documents are discharged to the paper discharge tray 215 by the paper discharge roller 214.

The scanner unit 22 generates image data by optically reading document images. The scanner unit 22 comprises a platen glass 221, alight source 222, a first mirror 223, a second mirror 224, a third mirror 225, a first carriage 226, a second carriage 227, an imaging lens 228, and a Charge Coupled Device (CCD) 229. The scanner unit 22 uses a daylight fluorescent lamp such as a cold cathode fluorescent lamp as the light source 222. The light that is irradiated by the light source 222 and reflected by the document is guided to the CCD 229 by the first mirror 223, the second mirror 224, the third mirror 225, and the imaging lens 228. Due to its use of a daylight fluorescent lamp such as a cold cathode fluorescent lamp as the light source 222, the scanner unit 22 affords color reproducibility that is superior to that of a CIS 231, which will be described subsequently and employs a tricolor LED as its light source.

The platen glass 221 has a document placed thereon by the user when the document is to be read in a flatbed reading mode. The light source 222 and the first mirror 223 are supported by the first carriage 226, and the second mirror 224 and the third mirror 225 are supported by the second carriage 227.

Document reading systems of the image reading device 2 include a flatbed reading mode, in which the scanner unit 22 reads a document placed on the platen glass 221, and an ADF reading mode, in which the document is received by the document supply unit 21 (ADF) and the document is read under conveyance. In the flatbed reading mode, the document placed on the platen glass 221 is irradiated with light from the light source 222, and reflected light equivalent to one line in a main scanning direction is reflected by the first mirror 223, the second mirror 224, and the third mirror 225 in that order, before entering the imaging lens 228. After entering the imaging lens 228, the light is made to form an image on the light-receiving surface of the CCD 229. The CCD 229 is a one-dimensional image sensor that processes one line's worth of a document image at a time. The first carriage 226 and the second carriage 227 are configured to be capable of moving in directions that are orthogonal to the main scanning direction (in a secondary scanning direction and in the direction of arrow Y). Reading is performed one line at a time while moving the first carriage 226 and the second carriage 227 in the secondary scanning direction.

In the ADF reading mode, the first carriage 226 and the second carriage 227 are positioned below a reading window 230. In this state, the document supply unit 21 picks up the documents placed in the document tray 211 one page at a time by means of a pickup roller 212. A document is conveyed by the document supply unit 21 and thus passes over the reading window 230 provided in the conveyance path from the conveyance drum 213 to the paper discharge tray 215. The document, which passes through the reading window 230, is irradiated with light from the light source 222. The light reflected by the document is reflected by the first mirror 223, the second mirror 224, and the third mirror 225 in that order, and then enters the imaging lens 228. Upon entering the imaging lens 228, the light is made to form an image on the light-receiving surface of the CCD 229. In the ADF reading mode, reading is also performed one main scanning line at a time.

Furthermore, the document supply unit 21 comprises a document reversing mechanism that includes a switching guide 216, a reversing roller 217, and a reverse conveyance path 218. A document whose upper side (one side of the document) has been read by a first ADF reading operation is reversed from the upper side to the reverse side by the document reversing mechanism and then re-conveyed to the reading window 230 (scanner unit 22). As a result, the reverse side (other side of the document) is read once again by the CCD 229. The document reversing mechanism operates only when double-sided reading is performed, and does not operate when single-sided reading is performed. During double-sided reading, the switching guide 216 is switched to a lower position, the upper surface of the document is read, and then the document is conveyed to the reverse conveyance path 218 by the reversing roller 217. The switching guide 216 is subsequently switched to an upper position, and the reversing roller 217 is rotated in reverse in order to re-feed the document to the conveyance drum 213. The reverse side of the document is then read and the document is discharged by the paper discharge roller 214 to the paper discharge tray 215. Note that, during single-sided reading, the switching guide 216 is located in an upper position. Hereinafter, the mode in which both sides of the document are read using the document reversing mechanism will be referred to as the "double-sided reverse reading mode".

In addition to the double-sided reverse reading mode, the image reading device 2 of the present embodiment has, when in ADF reading mode, a mode in which the reverse side of the document is read by the CIS 231 approximately at the same time (roughly in parallel) as the upper side of the document is read by the CCD 229 (the scanner unit 22) while the document is being conveyed as described earlier. In this case, the document, which is conveyed from the document tray 211 by the document supply unit 21, has its upper side read by the CCD 229 upon passing over the reading window 230, and the reverse side is read when the document passes through the location of the CIS 231. Note that an RGB tricolor LED or the like is used as the light source in the CIS 231. By using the CCD 229 and the CIS 231 in this way, both the upper and reverse sides of the document can be read by means of a single document conveyance operation (one pass) from the document tray 211 to the paper discharge tray 215, which is performed by the document supply unit 21. A mode in which both sides of the document are read using the CCD 229 and the CIS 231 will be referred to hereinbelow as the "double-sided simultaneous reading mode".

A document that has been read in the double-sided simultaneous reading mode is discharged to the paper discharge tray 215 with the document placed in the document tray 211 in a reversed state. Hence, in a case where a stack of documents are placed in the document tray 211 and each document is read, the stack of documents in the paper discharge tray 215 enters a state where the stack of documents in the document tray 211 is in a reversed state. The page order of the stack of documents in the paper discharge tray 215 is the same as the page order of the stack of documents that had been placed in the document tray 211.

In contrast, for a document that is read in the double-sided reverse reading mode, in a case where a document that has had an image read from its reverse side by the CCD 229 is discharged to the document tray 211 as is, the page order of the stack of documents in the paper discharge tray 215 differs from the page order of the stack of documents that had been placed in the document tray 211. Hence, in the double-sided reverse reading mode, a change in the page order of the stack of documents is prevented by using the document reversing mechanism to once again reverse the documents that have had an image read from their reverse side by the CCD 229 before discharging the documents to the document tray 211.

The multifunction machine 1 further comprises an apparatus main body 3 and a stack tray 6 that is disposed to the left of the apparatus main body 3. The apparatus main body 3 includes a plurality of paper supply cassettes 461, a paper supply roller 462 that delivers paper (recording paper) from the paper supply cassettes 461 one sheet at a time, and conveys the paper to a printing unit (printing means) 40, and the printing unit 40, which forms an image on the paper that has been conveyed from the paper supply cassettes 461. Furthermore, the apparatus main body 3 includes a paper supply tray 471, and a delivery roller 472 that delivers paper placed in the paper supply tray 471 one sheet at a time to the printing unit 40.

The printing unit (image forming unit) 40 comprises a static elimination device 421, an electrification device 422, an exposure device 423, development devices 44Bk, 44Y, 44M, and 44C, a transfer drum 49, a transfer roller (transfer device) 41, and a fixing device 45. The static elimination device 421 is a device that eliminates residual charge from the surface of a photoreceptor drum 43. The electrification device 422 is a device that electrifies the surface of the photoreceptor drum 43 after charge has been eliminated. The exposure device 423 is a device that forms an electrostatic latent image on the surface of the photoreceptor drum 43 by outputting laser light, on the basis of image data that is acquired by the scanner unit 22, to expose the surface of the photoreceptor drum 43. The development devices 44Bk, 44Y, 44M, and 44C are devices for forming toner images in each of the colors cyan (C), magenta (M), yellow (Y), and black (Bk) respectively on the photoreceptor drum 43 on which the electrostatic latent image has been formed. The toner images in each color thus formed on the photoreceptor drum 43 are transferred to and overlaid on the transfer drum 49. The transfer roller 41 is a device for transferring the toner images on the transfer drum 49 to the paper. The fixing device 45 is a device that heats the paper to which the toner images have been transferred to fix the toner images to the paper. Note that toner for each of the colors cyan, magenta, yellow, and black is supplied from toner supply receptacles (toner cartridges) which are shown schematically. Furthermore, conveyance rollers 463 and 464 and so forth, which convey the paper that has passed through the printing unit 40 to the stack tray 6 or a discharge tray 48, are provided.

When an image is to be formed on both sides of the paper, after an image has been formed by the printing unit 40 on one side of the paper, the paper enters a state of being nipped by the conveyance roller 463 on the discharge tray 48 side. In this state, the paper is flipped over by reversing the conveyance roller 463, and the paper is sent to the paper conveyance path L and re-conveyed upstream of the printing unit 40. Thereafter, after an image has been formed on the other side by the printing unit 40, the paper is discharged to the stack tray 6 or the discharge tray 48.

The multifunction machine 1 comprises an operating unit 5 that is disposed in front of the apparatus main body 3. The operating unit 5 comprises a display unit that enables the user to observe an operations screen and various messages and so forth, and operating buttons for inputting various operating commands.

Figure 2:
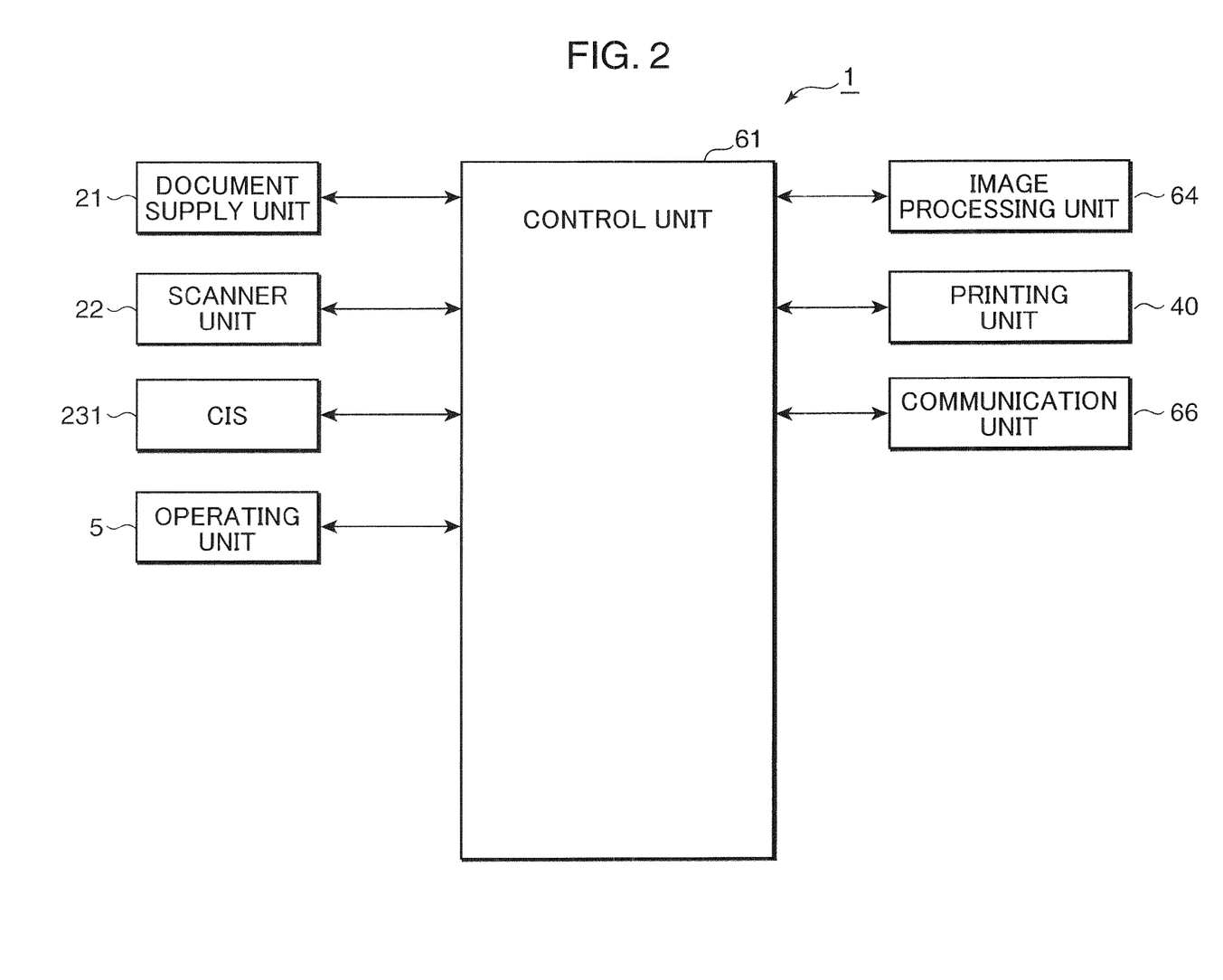
FIG. 2 is a block diagram showing an electrical configuration of the multifunction machine.

FIG. 2 is a block diagram showing an electrical configuration of the multifunction machine 1. Note that the same reference symbols are assigned to the same parts as the parts shown in FIG. 1 and a detailed description of such parts is omitted. The multifunction machine 1 comprises the document supply unit 21, the scanner unit 22, the CIS 231, the operating unit 5, an image processing unit 64, the printing unit 40, a communication unit 66, and a control unit 61.

The document supply unit 21 is used in a case where a copy function, a facsimile transmission function, or a scanner function is selected and a document is read in the ADF reading mode. The document supply unit 21 automatically picks up the document placed in the document tray 211 and conveys the document to allow the document to be read by the CCD 229 alone, or by the CCD 229 and the CIS 231. The scanner unit 22, the CIS 231, and the operating unit 5 correspond to the scanner unit 22, the CIS 231, and the operating unit 5 which are shown in FIG. 1.

The image processing unit 64 performs various image data-related image processing. For example, the image processing unit 64 performs level or gamma correction or other corrective processing, compression or expansion processing, enlargement or reduction processing, or other image processes with respect to image data that is acquired by the CCD 229 or the CIS 231 or with respect to image data that comes to be transferred via the communication unit 66 from a network-connected personal computer or a facsimile device connected via a public line.

The printing unit 40 forms an image on the paper (recording paper) that is based on image data obtained by the CCD 229 or the CIS 231, or on image data that is transferred via the communication unit 66 from the personal computer or facsimile device or the like.

The communication unit 66 sends and receives, via a network interface, various data between external devices such as a computer and a facsimile device that are connected via a network.

The control unit 61 controls the overall operation of the multifunction machine 1, and comprises a CPU and a storage device and so forth. The document supply unit 21, the scanner unit 22, the CIS 231, the operating unit 5, the image processing unit 64, the printing unit 40, and the communication unit 66 operate under the control of the control unit 61. The control unit 61 executes processing based on an operation control program that is stored in a ROM or HDD (schematically shown) in response to various instruction signals and so on that are input from the user to the operating unit 5, and centrally controls the multifunction machine 1 by outputting instruction signals to the respective functional units and performing data transfers and so on.

Figure 3:
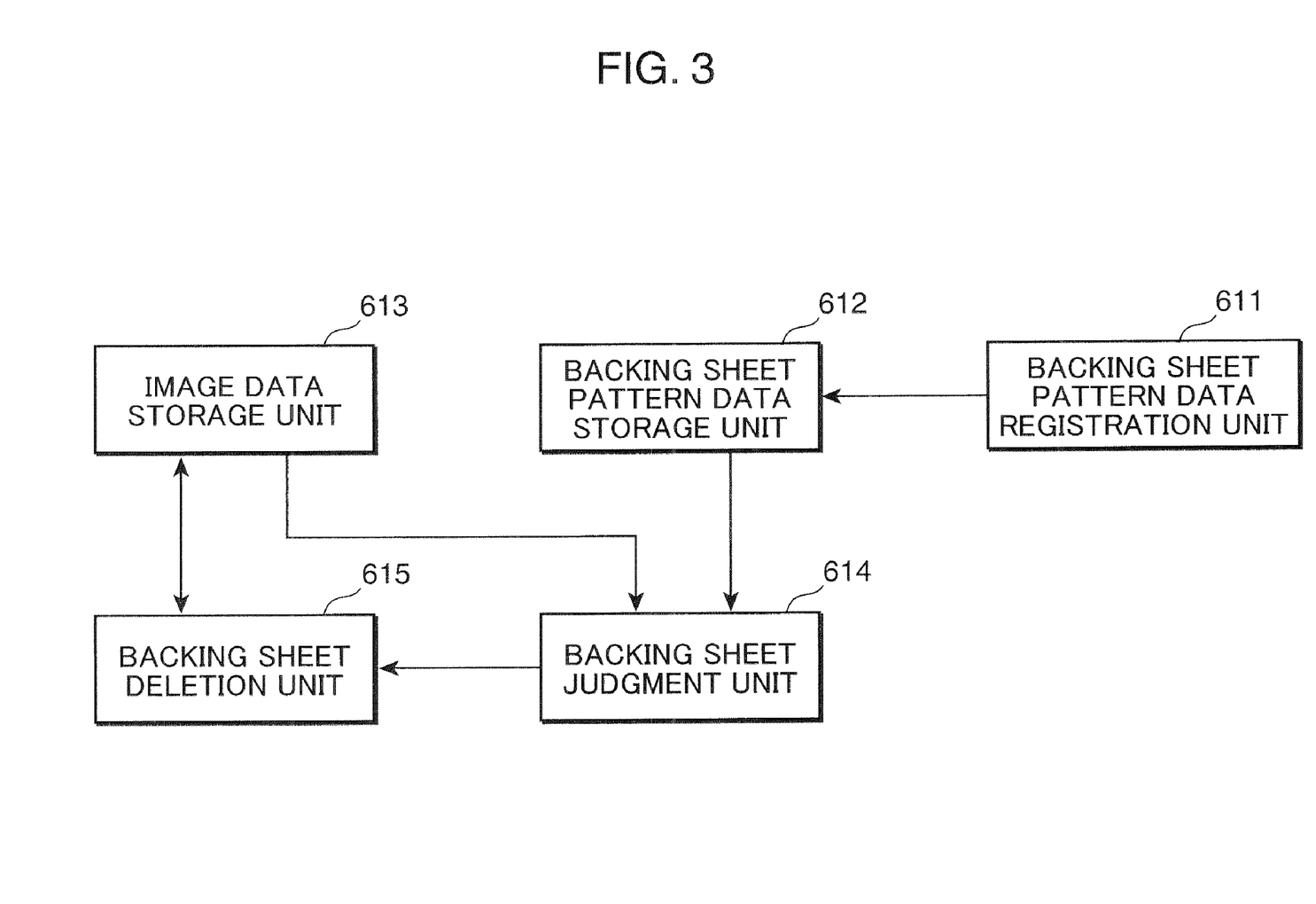
FIG. 3 is a function block diagram of a control unit in the multifunction machine.

As shown in the function block diagram of FIG. 3, the control unit 61 includes a backing sheet pattern data registration unit (backing sheet pattern data registration means) 611, a backing sheet pattern data storage unit (backing sheet pattern data registration means) 612, an image data storage unit 613, a backing sheet judgment unit 614, and a backing sheet deletion unit 615.

The backing sheet pattern data registration unit 611 registers image data serving as a single-sided print target as backing sheet pattern data when the printing unit 40 is to print an image on a single side of the paper. Note that registration of the backing sheet pattern data involves the backing sheet pattern data registration unit 611 storing backing sheet pattern data in the backing sheet pattern data storage unit 612.

Here, the printing unit 40 prints an image on one side of the paper in the following four circumstances, for example.

(1) Copy image data read by the scanner unit 22 is copied to one side of the paper. (2) Print-out image data is printed out onto one side of the paper in response to a single-sided print request from an external computer. (3) Facsimile-received image data received via facsimile is printed out on one side of the paper. (4) Various saved image data (saved scanner data or facsimile-received image data or the like) stored in a built-in storage device (HDD or the like) is printed out on one side of the paper.

The backing sheet pattern data storage unit 612 comprises a storage area (a predetermined area of a storage device such as a HDD) for storing backing sheet pattern data. The backing sheet pattern data storage unit 612 may store backing sheet pattern data as bitmap-format data without reducing or compressing the data, may store the data as data that has been compressed to an extent that allows matching processing, or may store the data as data that is compressed using a typical compression method such as image encoding.

The image data storage unit 613 includes a storage area (a predetermined area of a storage device such as a RAM or HDD) for storing image data read by the scanner unit 22.

The backing sheet judgment unit 614 judges whether the read image data is backing sheet data by checking the image data read by the scanner unit 22 and stored in the image data storage unit 613 against the backing sheet pattern data that is stored in the backing sheet pattern data storage unit 612. A general image checking algorithm can be applied to the processing to check the image data against the backing sheet pattern data. For example, an image matching algorithm can be used with which the mean square error is calculated by taking a differential for each pixel value of the image data and backing sheet pattern data, or an image matching algorithm can be used by dividing the image data and backing sheet pattern data into a plurality of areas in order to compare a characteristic amount for each divided area.

In a case where the image data is judged by the backing sheet judgment unit 614 to be backing sheet data, the backing sheet deletion unit 615 deletes only backing sheet data from the image data that has been read by the scanner unit 22 and stored in the image data storage unit 613. Where the deletion of backing sheet data from the image data is concerned, image data that corresponds to the backing sheet data may be deleted, or a deletion flag may be raised for image data corresponding to the backing sheet data and subsequent processing (copy processing or filing processing or the like) may be performed by taking account of the fact that image data with a deletion flag set is to be deleted.

Figure 4:
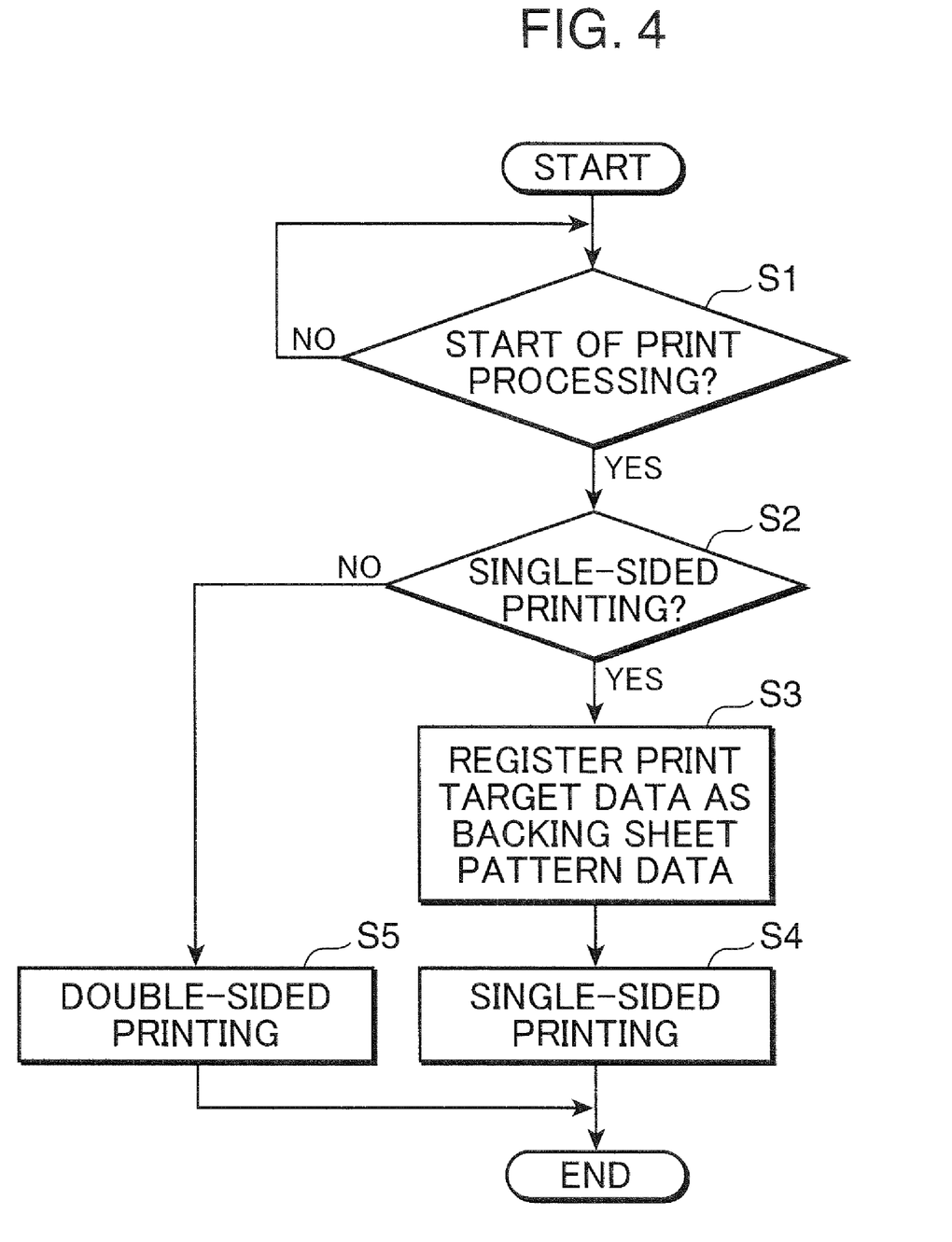
FIG. 4 is a flowchart showing print processing by the multifunction machine.

The operation of the multifunction machine 1 according to this embodiment will be described next. FIG. 4 is a flowchart of print processing (image forming processing) by the multifunction machine 1.

As shown in FIG. 4, when print processing is started (YES in S1), judgment is made by the backing sheet pattern data registration unit 611 (see FIG. 3) of whether or not single-sided printing that performs printing only on one side of the paper is to be performed (S2). Here, print processing encompasses all print processes, including copy processing of copy image data read by the scanner unit 22, printout processing corresponding to a print request from an external computer, a print output of facsimile-received image data received via facsimile, and a print output of various saved image data (scan data or facsimile-received image data, and so forth) that is stored in a built-in storage device (HDD or the like).

In a case where the print processing is single-sided printing (YES in S2), the backing sheet pattern data registration unit 611 registers the print target data (copy image data, printout image data, facsimile-received image data, saved image data, and so forth) as backing sheet pattern data (S3). Thereafter, the print target data is printed on one side of the paper (S4).

Note that, in the case of single-sided printing (YES in S2), the processing to register the backing sheet pattern data (S3) and the printing of print target data (S4) may be carried out substantially simultaneously, or the processing to register the backing sheet pattern data may be performed after single-sided printing is executed.

In a case where the print processing is double-sided printing (NO in S2), the registration of backing sheet pattern data is not performed and the print target data is printed on both sides of the paper (S5).

The reason why print target data is registered as backing sheet pattern data only when single-sided printing is performed as mentioned earlier is that it is highly likely that printed matter resulting from the printing of a single side of a sheet blank on both sides will subsequently be used as a backing sheet. In other words, if print target data for single-sided printing is automatically registered and stored as backing sheet pattern data at the moment when single-sided printing is performed, the user is not forced to carry out special work relating to the registration of the backing sheet pattern data, and hence the user's workload can be reduced.

The copy image data, the printout image data, and facsimile-received image data of step S3 will now be described in more detail.

(1) Print target data is copy image data that is read by the image reading device 2 to create a copy. The backing sheet pattern data registration unit 611 registers copy image data for when a single-sided copy is made as backing sheet pattern data.

According to this configuration, when a single-sided copy is made, since copy image data read by the image reading device 2 is automatically registered as backing sheet pattern data, the user is not forced to carry out special work relating to the registration of backing sheet pattern data, and hence the user's workload can be reduced.

(2) The print target data is printout image data that serves as the print target in accordance with a print request from an external computer. The backing sheet pattern data registration unit 611 registers the printout image data at the time of the single-sided print request from the external computer as backing sheet pattern data.

According to this configuration, since printout image data is automatically registered as backing sheet pattern data when a single-sided print request is received from an external computer, the user is not forced to carry out special work relating to the registration of backing sheet pattern data, and hence the user's workload can be reduced.

(3) The print target data is facsimile-received image data generated when a facsimile is received. The backing sheet pattern data registration unit 611 registers facsimile-received image data at the moment when single-sided printing is performed upon receipt of a facsimile, as backing sheet pattern data.

According to this configuration, since facsimile-received image data is automatically registered as backing sheet pattern data at the moment when single-sided printing is performed upon receipt of a facsimile, the user is not forced to carry out special work relating to the registration of backing sheet pattern data, and hence the user's workload can be reduced.

The image forming apparatus according to the present embodiment further comprises detection means (a detection mechanism) for detecting whether or not an unprinted side of paper that has undergone single-sided printing is blank, and the backing sheet pattern data registration means 611 and 612 can be configured to not register print target data as backing sheet pattern data in a case where the printing unit 40 prints an image on one side of the paper but the unprinted side of the paper is not blank.

Normally, paper that is blank on both sides is used for printing, but a backing sheet may also be used as printing paper. In a case where a backing sheet is used as printing paper, once single-sided printing has been performed, the paper has an image recorded on both sides and can no longer be used as a backing sheet. Detection means for detecting whether an unprinted side of paper that has undergone single-sided printing is blank is therefore provided. In a case where the printing unit 40 prints an image on one side of the paper but the unprinted side of the paper is not blank, the backing sheet pattern data registration unit 611 does not register the print target data as backing sheet pattern data. Unnecessary registration of backing sheet pattern data can thus be avoided.

Furthermore, in addition to "backing sheet pattern data automatic registration mode", in which backing sheet pattern data is automatically registered every time single-sided printing is performed as described earlier, a "backing sheet pattern data manual registration mode" whereby the user himself is able to register backing sheet pattern data may also be provided. In a case where a "backing sheet pattern data manual registration mode" is selected by operating the operating unit 5, the backing sheet can be scanned by means of the scanner unit 22 and registered as backing sheet pattern data.

Further, the backing sheet pattern data automatic registration mode can also be temporarily canceled by operating the operating unit 5 in cases where a document which the user does not want to be registered as backing sheet pattern data undergoes single-sided copying or the like.

In addition, if the volume of automatically registered backing sheet pattern data becomes too large, the following two problems arise. (1) The time taken for the processing by the backing sheet judgment unit 614 increases since there is an increase in the volume of backing sheet pattern data stored in the backing sheet pattern data storage unit 612. (2) A situation arises where the storage capacity of the backing sheet pattern data storage unit 612 is exceeded. The following measures can be taken to avoid these problems.

In a case where the automatically registered backing sheet pattern data has reached a predetermined storage capacity, new backing sheet pattern data is stored while the oldest backing sheet pattern data is deleted.

Furthermore, in a case where the automatically registered backing sheet pattern data has reached a predetermined number of backing sheets, the latest backing sheet pattern data is stored while registration of the oldest backing sheet pattern data is deleted.

Note that it is better not to delete, for the purpose of storing the latest backing sheet pattern data, registration of backing sheet pattern data, among the automatically registered backing sheet pattern data, that is actually used by the backing sheet judgment unit 614 to recognize a backing sheet, or backing sheet pattern data that has been registered in the backing sheet pattern data manual registration mode. This is because such backing sheet pattern data is more likely than other automatically registered backing sheet pattern data to be subsequently used as a backing sheet.

Figure 5:
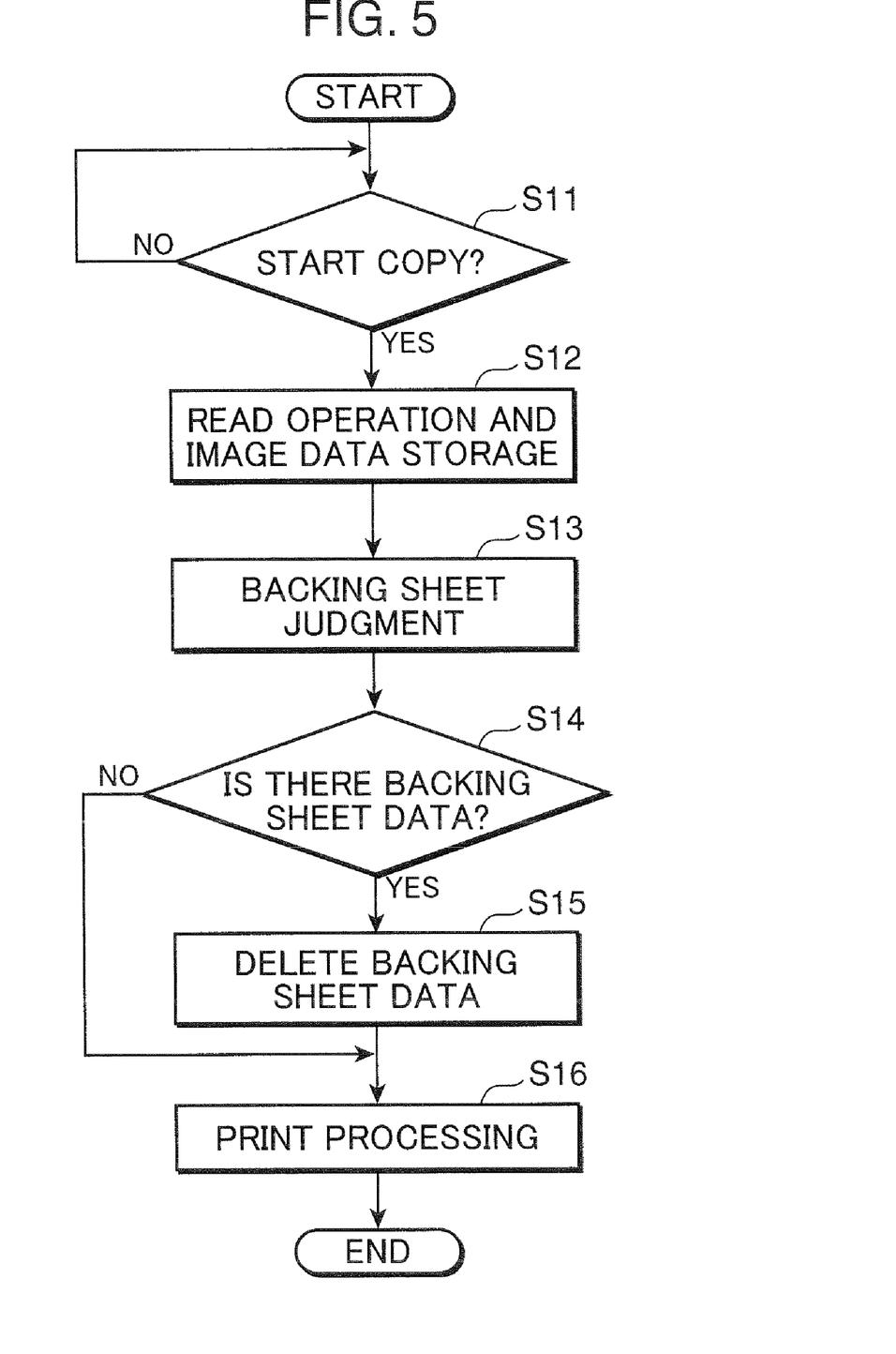
FIG. 5 is a flowchart showing copy processing by the multifunction machine.

Copy processing (image forming processing) by the multifunction machine 1 according to the present embodiment will be described next. In particular, copy processing in which both sides of a double-sided document are read will be described here. In a case where a single-sided document using a backing sheet comes to be mixed in with double-sided documents, if both sides of each document are read, unnecessary backing sheet data will then also be included. However, as will be described in detail hereinbelow, the multifunction machine 1 of the present embodiment is capable of performing copy processing in which unnecessary backing sheet data is removed even when a single-sided document using a backing sheet comes to be mixed in with double-sided documents. FIG. 5 is a flowchart showing the copy processing by the multifunction machine 1.

First, as a result of the user operating the operating unit 5, a copy mode is selected and various copy-related settings (settings for the number of copies, enlargement/reduction, a single-sided/double-sided document, a single-sided/double-sided copy, and so forth) are made. Here, when a double-sided document is set and the start button on the operating unit 5 is pressed in a state where a stack of documents has been placed in the document tray 211 (YES in S11), the images of the various documents are read by the scanner unit 22, and the image data obtained in this read operation is stored in the image data storage unit 613 (S12).

The backing sheet judgment unit 614 then judges whether or not the image data thus read is backing sheet data by checking the image data which has been read by the scanner unit 22 and stored in the image data storage unit 613 against the backing sheet pattern data that is stored in the backing sheet pattern data storage unit 612 (S13).

In a case where the backing sheet judgment unit 614 judges that the data is backing sheet data (YES in S14), the backing sheet deletion unit 615 deletes only the backing sheet data from the image data that has been read by the scanner unit 22 and stored in the image data storage unit 613 on the basis of the judgment result of the backing sheet judgment unit 614 (S15). Thereafter, print processing by the printing unit 40 is performed on the image data from which the backing sheet data has been deleted (S16). As a result, copy processing can be performed in a state where backing sheet data has been removed from the scanned image data.

Note that, in a case where the backing sheet judgment unit 614 judges that no backing sheet data is present (NO in S14), print processing by the printing unit 40 or the like is performed on all the image data stored in the image data storage unit 613 (S16).

The print processing (image forming processing) routine shown in FIG. 4 is adopted as the aforementioned print processing.

Note that copy processing by the multifunction machine 1 was described hereinabove using FIG. 5 but this also applies to filing processing by the multifunction machine 1. In other words, also in cases where filing processing is started, S12 to S15 above are carried out and image data is filed (data storage in a built-in HDD or the like) in a state where backing sheet data is removed from the scanned image data.

As described earlier, the image forming apparatus according to the present embodiment comprises an image reading device 2, backing sheet pattern data registration means 611 and 612 for registering backing sheet pattern data, a backing sheet judgment unit 614 for judging whether or not the image data thus read is backing sheet data that matches the backing sheet pattern data by checking the image data read by the image reading device 2 against the backing sheet pattern data, a backing sheet deletion unit 615 for deleting backing sheet data from image data that is read by the image reading device 2 when it is judged by the backing sheet judgment unit 614 that the image data is backing sheet data, and a printing unit 40 that prints images on paper on the basis of print target data, in which the backing sheet pattern data registration unit 611 registers, as backing sheet pattern data, print target data for when the printing unit 40 prints an image on a single side of the paper.

According to the above configuration, judgment is made by the backing sheet judgment unit 614 of whether image data read by the image reading device 2 is backing sheet data that matches the backing sheet pattern data by checking the image data against the backing sheet pattern data registered by the backing sheet pattern data registration means 611 and 612. In a case where judgment is made by the backing sheet judgment unit 614 that the image data is backing sheet data that matches the backing sheet pattern data, the backing sheet deletion unit 615 deletes the backing sheet data from the image data thus read. It is thus possible to implement the subsequent processing (copy processing or filing processing, for example) in a state where the backing sheet data has been removed from the read image data.

Here, the backing sheet pattern data registration means 611 and 612 register print target data for when the printing unit 40 prints an image on one side of the paper as backing sheet pattern data. The reason why print target data is registered as backing sheet pattern data only when single-sided printing is performed in this manner is that it is highly likely that printed matter printed on one side will subsequently be used as a backing sheet. In other words, if print target data for single-sided printing is automatically registered and stored as backing sheet pattern data at the moment when single-sided printing is performed as per the present embodiment, the user is not forced to carry out special work relating to the registration of the backing sheet pattern data, and hence the user's workload can be reduced.

Figure 6:
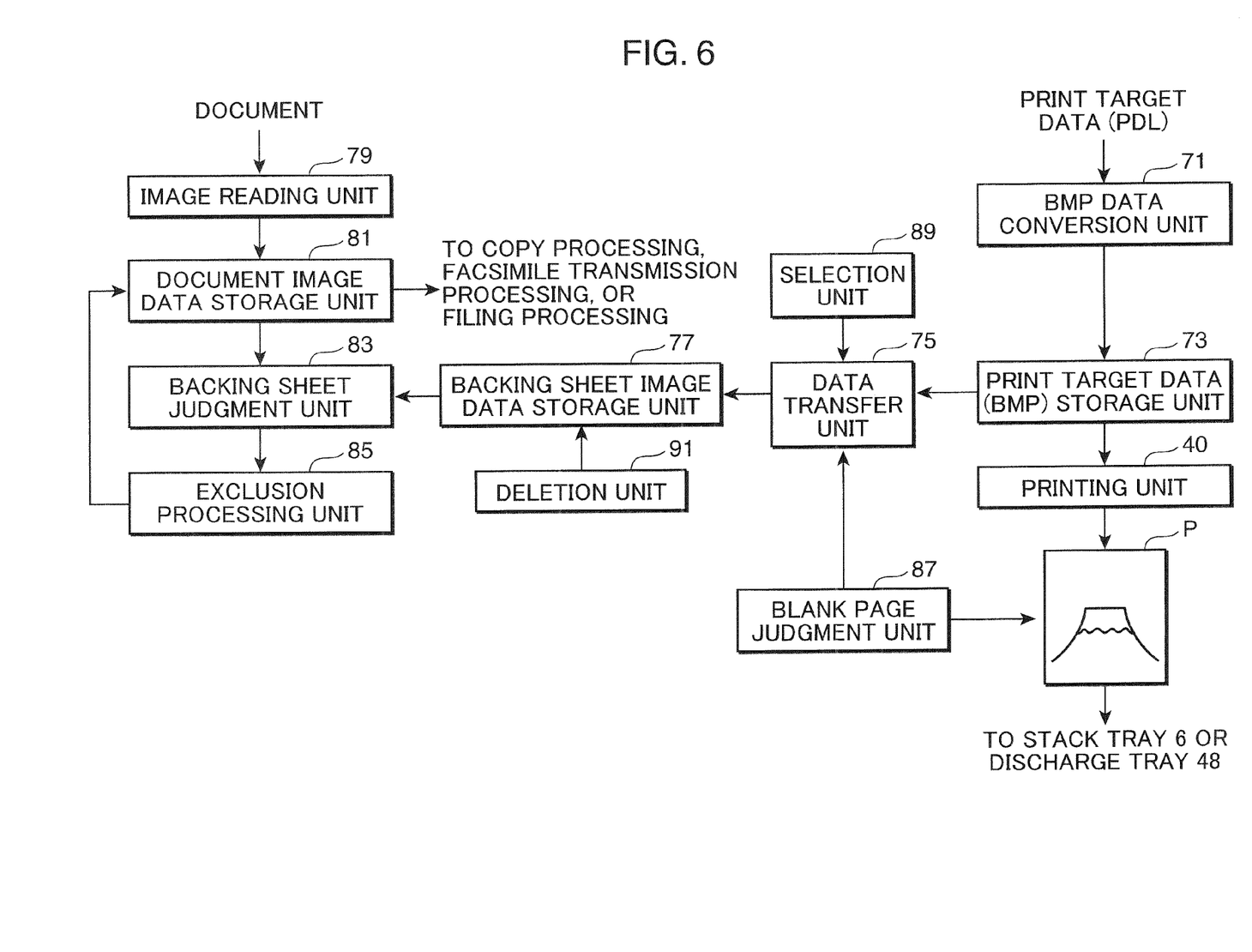
FIG. 6 shows function blocks of another embodiment of the image forming apparatus according to the present invention.

A further embodiment of the image forming apparatus according to the present invention will be described next. FIG. 6 shows function blocks of the further embodiment. The image forming apparatus comprises a printing unit 40, a backing sheet image data storage unit 77, an image reading unit 79, a backing sheet judgment unit 83, and an exclusion processing unit 85, and the like.

The printing unit 40 is capable of executing a single-sided print job in which one side of paper P is printed and a double-sided print job in which both sides of the paper P are printed. A single-sided and a double-sided print job are executed by at least one function from among a copy function, a facsimile receive function, and a printer function.

In a print job, print target data of various data formats is converted to the Page Description Language (PDL) format. Print target data in the PDL format is converted into the bitmap format by the bitmap data conversion unit 71. The print target data that has been converted to the bitmap format is stored in the print target data storage unit 73. The print target data in the bitmap format, which is stored in the storage unit 73, is sent to the printing unit 40 and an image corresponding to the print target data is formed on the paper P and discharged to the stack tray 6 or the discharge tray 48. The functions of the bitmap data conversion unit 71 are implemented by the control unit 61 shown in FIG. 2, or the like. The functions of the print target data storage unit 73 are implemented by a storage device or the like which the control unit 61 comprises.

A data transfer unit 75 transfers print target data stored in the storage unit 73 to the backing sheet image data storage unit 77 when a single-sided print job is performed by the printing unit 40 on the print target data. The storage unit 77 stores the transferred print target data as backing sheet image data. The backing sheet image data may be stored in bitmap format or may be stored in another format (compressed or reduced, and so on).

Therefore, in a case where a single-sided print job is executed, print target data in the bitmap format, which is stored in the print target data storage unit 73, is sent to the printing unit 40 and the storage unit 77. The functions of the data transfer unit 75 are implemented by the control unit 61 or the like. The functions of the backing sheet image data storage unit 77 are implemented by a storage device or the like that the control unit 61 comprises.

Meanwhile, the image reading unit 79 reads images on both sides of a document that is subjected to image processing for at least one of copying, facsimile transmission, and scanning operation. The functions of the image reading unit 79 are implemented by the image reading device 2 shown in FIG. 1, or the like.

The document image data storage unit 81 stores image data of both sides of a document that is read by the image reading unit 79. The image data for both sides of the document may be stored in the bitmap format or stored in another format (compressed or reduced or the like). The functions of the document image data storage unit 81 are implemented by a storage device or the like that the control unit 61 comprises.

The backing sheet judgment unit 83 judges whether there is an image that matches the backing sheet image among the images on both sides of a document stored in the storage unit 81 by checking the image data of the document against the backing sheet image data that is stored in the storage unit 77. The backing sheet judgment unit 83 corresponds to the backing sheet judgment unit 614 shown in FIG. 3. In judging whether there is an image match, image data in the bitmap format, for example, is used for both the document image data and the backing sheet image data, and an image checking algorithm that is executed by the backing sheet judgment unit 614 is used. The functions of the backing sheet judgment unit 83 are implemented by the control unit 61 or the like.

The exclusion processing unit 85 performs processing to exclude, from the image processing target, an image judged by the backing sheet judgment unit 83 to match the backing sheet image from among the images on both sides of the document read by the image reading unit 79. More specifically, the corresponding image data that is stored in the document image data storage unit 81 may be deleted, or a flag indicating that the image data is not to be subjected to image processing may be erected without deleting the image data. The functions of the exclusion processing unit 85 are implemented by the control unit 61 or the like.

Among the document image data stored in the storage unit 81, image data that is subjected to exclusion processing by the exclusion processing unit 85 is backing sheet image data, and therefore not an image processing target. This will now be described by way of an example in which three double-sided documents are copied. When three double-sided documents (of six pages) are read by the image reading unit 79 and a fourth page (of second sheet) among the three double-sided documents is judged by the backing sheet judgment unit 83 to be a backing sheet, the image data of the fourth page is excluded from the copy target.

Image data that has undergone exclusion processing by the exclusion processing unit 85 is sent to the printing unit 40 if the data is a copy processing target, sent to the communication unit 66 shown in FIG. 2 if the image data is a facsimile transmission processing target, and sent to a filing processing unit (not shown) if the image data is a scanner processing target. Copying of the three double-sided documents will now be described by way of example. After executing processing to exclude the image data of the fourth page from the copy processing target, the image data of the remaining pages is converted to PDL format, and then converted to the bitmap format, whereupon paper P on which the images of the first page, second page, third page, fifth page, and sixth page are formed is output from the printing unit 40.

As described hereinabove, according to the present embodiment, when a single-sided print job is executed, print target data is automatically stored as backing sheet image data. This is because it is considered highly likely that paper P that has been printed on only one side will be used as a backing sheet. Thus, according to the present embodiment, backing sheet image data can be automatically collected, therefore saving the user the trouble of registering backing sheet image data himself.

The image forming apparatus according to the present embodiment further comprises a blank page judgment unit 87, a selection unit 89, and a deletion unit 91. The blank page judgment unit 87 judges whether or not an unprinted side of the paper P is blank when a single-sided print job is executed by the printing unit 40. The blank page judgment unit 87 corresponds to the abovementioned detection means for detecting whether or not the unprinted side (reverse side) is blank. The blank page judgment unit 87 uses a one-dimensional image sensor, for example, to read the unprinted page of the paper P that passes through the fixing device 45 in FIG. 1, and judges whether the unprinted side is blank. The functions of the blank page judgment unit 87 are implemented by the image sensor that read the unprinted side of the paper P and the control unit 61 and so forth.

If the single-sided print job is executed by using backing-sheet paper P, the paper P does not have a blank side and cannot be used as a backing sheet. There is no need to store such print target data using the backing sheet image data storage unit 77. Hence, when a single-sided print job is executed using paper P blank on both sides, the print target data is stored in the backing sheet image data storage unit 77. The blank page judgment unit 87 is used to judge whether the paper P is a backing sheet or a sheet blank on both sides. If paper P of a sheet blank on both sides is used, it is judged that the unprinted side of the paper P is blank, and therefore the transfer unit 75 transfers the print target data stored in the print target data storage unit 73 to the backing sheet image data storage unit 77. The storage unit 77 stores the transferred print target data as backing sheet image data.

The selection unit 89 is configured to allow the user to select whether the print target data stored in the storage unit 73 is to be stored in the storage unit 77 as backing sheet image data in cases where a single-sided print job is executed by the printing unit 40. The selection unit 89 corresponds to the "backing sheet pattern data automatic registration mode can also be temporarily canceled." mentioned earlier. It is also thought that even when a single-sided print job is executed, the user may not treat print target data as backing sheet image data. The functions of the selection unit 89 are implemented by the control unit 61 and the operating unit 5 and so forth.

The deletion unit 91 corresponds to the "if the volume of automatically registered backing sheet pattern data becomes too large, the following two problems arise." mentioned earlier, and is provided in order to avoid these two problems. The deletion unit 91 includes the following two modes of operation.

In cases where the amount of backing sheet image data stored in the backing sheet image data storage unit 77 reaches a predetermined amount, the deletion unit 91 deletes partial backing sheet image data starting with backing sheet image data that was stored first.

When the number of backing sheet images in the backing sheet image data stored in the backing sheet image data storage unit 77 reaches a predetermined number, the deletion unit 91 deletes partial backing sheet image data sequentially starting with backing sheet image data that was stored first.

For example, when the date the backing sheet image data stored in the backing sheet image data storage unit 77 was first stored (the oldest date) is Jan. 1, 2009 and the date when this image data was last stored (latest date) is Feb. 1, 2009, backing sheet image data between Jan. 1, 2009 and Jan. 10, 2009 is deleted. It is thus possible to reduce the capacity of the backing sheet image data that is stored in the backing sheet image data storage unit 77.

In either case, the deletion unit 91 can be configured to not delete image data of a backing sheet image that is judged by the backing sheet judgment unit 83 to match a document image.

The image forming apparatus according to this embodiment, which is shown in FIG. 6, includes the following aspects. The printing unit 40 includes a first paper supply unit (for example the lower paper supply cassette 461 in FIG. 1) for supplying backing-sheet paper P, and a second paper supply unit (the upper and middle paper supply cassettes 461) for supplying paper P blank on both sides. When the abovementioned single-sided print job is executed using the paper that is supplied from the first paper supply unit, the backing sheet image data storage unit 77 does not store the print target data as backing sheet image data, and when the abovementioned single-sided print job is executed using the paper that is supplied from the second paper supply unit, the backing sheet image data storage unit 77 stores the print target data as backing sheet image data.

According to this aspect, paper supply units for supplying backing sheet paper P and paper P blank on both sides are provided separately, and it is therefore possible to distinguish whether the paper P used in the single-sided print job is backing sheet paper P or paper P blank on both sides. Hence, even when the blank page judgment unit 87 is not provided, when a single-sided print job is executed using paper P blank on both sides, print target data can be stored in the backing sheet image data storage unit 77.

The present invention is not limited to the configurations of the above embodiments and can be modified in a variety of ways. For example, the thus described configuration and processing embodiments of the image forming apparatus according to the present invention are illustrated in FIGS. 1 to 6, but these embodiments are merely examples. The image forming apparatus according to the present invention is not intended to be limited to the configurations and controls described hereinabove.

This application is based on Japanese Patent Application Serial No. 2008-330701, filed in Japan Patent Office on Dec. 25, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
   a printing unit configured to execute a single-sided print job in which one side of a sheet is printed and a double-sided print job in which both sides of the sheet are printed;
   a storage unit for storing print target data as backing sheet image data in a case where a single-sided print job is executed by the printing unit with respect to the print target data;
   an image reading unit for reading images on both sides of a document that is subjected to image processing;
   a backing sheet judgment unit for judging whether there is an image that matches a backing sheet image among the images on both sides of the document by comparing the document image data read by the image reading unit with the backing sheet image data stored in the storage unit;
   an exclusion processing unit for performing processing to exclude from the image processing targets an image which is judged by the backing sheet judgment unit to match the backing sheet image among the images on both sides of the document read by the image reading unit;
   wherein the printing unit comprises:
   a first paper supply unit for supplying a backing sheet, and
   a second paper supply unit for supplying a sheet blank on both sides, wherein
   when the single-sided print job is executed using the sheet that is supplied from the first paper supply unit, the storage unit does not store the print target data as the backing sheet image data, and when the single-sided print job is executed using the sheet that is supplied from the second paper supply unit, the storage unit stores the print target data as the backing sheet image data.

2. The image forming apparatus according to claim 1, further comprising a blank page judgment unit that, in a case where the single-sided print job is executed by the printing unit, judges whether or not an unprinted side of the sheet is blank, wherein when the blank page judgment unit judges that the unprinted side of the sheet is blank, the storage unit stores the print target data as backing sheet image data.

3. The image forming apparatus according to claim 1, further comprising a selection unit that, in a case where the single-sided print job is executed by the printing unit, enables a user to select whether the print target data is to be stored in the storage unit as the backing sheet image data.

4. The image forming apparatus according to claim 1, further comprising a deletion unit that, in a case where the number of backing sheet images in the backing sheet image data stored in the storage unit reaches a predetermined number, deletes partial backing sheet image data sequentially starting with backing sheet image data that has been stored first.

5. The image forming apparatus according to claim 4, wherein the deletion unit does not delete the image data of a backing sheet image that is judged by the backing sheet judgment unit to match a document image.

6. The image forming apparatus according to claim 1, wherein the single-sided print job by the printing unit is executed by at least one function from among a copy function, a facsimile receive function, and a printer function.

7. The image forming apparatus according to claim 1, wherein the image processing is at least one of copying, facsimile transmission, and scanning operations.

* * * * *